(12) United States Patent
Schmitt (10) Patent No.: US 12,515,914 B2
(45) Date of Patent: Jan. 6, 2026

(54) ELEVATOR DRIVE AND ELEVATOR SYSTEM

(71) Applicant: Inventio AG, Hergiswil (CH)

(72) Inventor: Dominik Schmitt, Root (CH)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 18/706,765

(22) PCT Filed: Nov. 9, 2022

(86) PCT No.: PCT/EP2022/081233
§ 371 (c)(1),
(2) Date: May 2, 2024

(87) PCT Pub. No.: WO2023/083849
PCT Pub. Date: May 19, 2023

(65) Prior Publication Data
US 2024/0417214 A1 Dec. 19, 2024

(30) Foreign Application Priority Data
Nov. 9, 2021 (EP) ..................................... 21207033

(51) Int. Cl.
| | |
|---|---|
| *B66B 1/06* | (2006.01) |
| *B66B 5/02* | (2006.01) |
| *B66B 11/00* | (2006.01) |
| *B66B 11/04* | (2006.01) |
| *H02K 9/22* | (2006.01) |
| *H02K 11/33* | (2016.01) |

(52) U.S. Cl.
CPC .................. *B66B 1/06* (2013.01); *B66B 5/02* (2013.01); *B66B 11/0045* (2013.01); *B66B 11/043* (2013.01); *H02K 9/227* (2021.01); *H02K 11/33* (2016.01); *H02K 2211/03* (2013.01)

(58) Field of Classification Search
CPC . B66B 11/0045; B66B 11/008; B66B 11/043; H02K 11/33
See application file for complete search history.

(56) References Cited

U.S. PATENT DOCUMENTS

| | | | |
|---|---|---|---|
| 11,591,188 B2 * | 2/2023 | Watson | .................... B66B 11/08 |
| 2002/0100902 A1 | 8/2002 | Strbuncelj | |
| 2003/0094920 A1* | 5/2003 | Numaguchi | ........... H02K 11/33 |
| | | | 318/801 |

FOREIGN PATENT DOCUMENTS

| | | | | |
|---|---|---|---|---|
| CN | 201708766 U | * | 1/2011 | |
| CN | 104124849 A | * | 10/2014 | ............... H02K 3/28 |
| DE | 20101326 U1 | * | 4/2001 | ............. B66B 23/02 |
| DE | 10315267 A1 | | 10/2004 | |
| EP | 1517850 B1 | | 8/2014 | |
| IT | BO20110408 A1 | | 1/2013 | |

(Continued)

*Primary Examiner* — Diem M Tran
(74) *Attorney, Agent, or Firm* — Shumaker, Loop & Kendrick, LLP (57) ABSTRACT

An elevator drive for controlling an elevator system has an electric motor with a housing, the electric motor being a permanent magnet synchronous motor. The electric motor has a motor shaft that, on an axial portion of the shaft lateral surface outside the housing, has a drive zone for coupling to at least one support means of the elevator system. A ratio of a weight of the elevator drive to a nominal payload for which the elevator drive is designed is less than 0.2.

16 Claims, 3 Drawing Sheets

(56) References Cited

FOREIGN PATENT DOCUMENTS

| WO | 9832684 A1 | 7/1998 | | |
|---|---|---|---|---|
| WO | WO-2005040024 A2 * | 5/2005 | ............... | B66B 1/30 |
| WO | WO-2009075672 A1 * | 6/2009 | ............... | H02K 9/19 |
| WO | 2012156583 A1 | 11/2012 | | |
| WO | 2016109158 A1 | 7/2016 | | |
| WO | WO-2017129849 A1 * | 8/2017 | ............... | B66B 1/30 |

* cited by examiner

ELEVATOR DRIVE AND ELEVATOR SYSTEM

FIELD

The present invention relates to an elevator drive and an elevator system which comprises at least two of the elevator drives.

BACKGROUND

In a conventional elevator system for transporting one or more loads, for example persons or goods, over one, two or more floors, an elevator car is arranged, for receiving the load(s), in an elevator shaft of the elevator system. A counterweight, which is also arranged in the elevator shaft, is coupled to the elevator car via one, two or more support means, for example cables or belts. For vertically displacing the elevator car, an elevator drive is coupled to a traction sheave via which the support means extend, such that the elevator car and the counterweight can be displaced vertically by operating the elevator drive. Furthermore, a brake is generally arranged, by means of which the elevator car and/or the counterweights can be braked and/or locked.

In particular in large elevator systems, the elevator drive is conventionally arranged in a space above the elevator shaft, wherein a ceiling of the elevator shaft has recesses for passing through the support means. Due to the generally large nominal payloads of such elevator systems, large, high-power elevator drives are required for this purpose, which are capable of displacing the elevator car and the counterweights vertically without problem, even at full load. Such a powerful elevator drive generally has a particularly high weight. It follows from this that a ratio of a weight of the elevator drive to the nominal payload is correspondingly high. Examples of typical ratios of this kind are:

128 kg/450 kg=0.28; at a weight of the elevator drive of 128 kg (excluding inverter) and a nominal payload of 450 kg;

135 kg-145 kg/680 kg=0.19-0.21; at a weight of the elevator drive of 135 kg to 145 kg (excluding inverter) and a nominal payload of 680 kg;

175 kg-185 kg/800 kg=0.19-0.23; at a weight of the elevator drive of 175 kg to 185 kg (excluding inverter) and a nominal payload of 800 kg;

209 kg-228 kg/1360 kg=0.15-0.16; at a weight of the elevator drive from 209 kg to 228 kg and a nominal payload of 1360 kg.

The known elevator drives thus have high dead loads. Such heavy elevator drives are difficult to handle during assembly, in principle multiple persons and/or tools or machines being required for their placement. Furthermore, the statics and in particular the floors in the rooms above the elevator shafts must be designed such that they withstand these weights. These rooms already require a lot of space themselves, and suitable floors have an additional thickness.

SUMMARY

Thus, there may be a need for an elevator drive for an elevator system which can be easily handled or mounted and/or can be accommodated in a space-saving manner. A correspondingly equipped elevator system may also be required.

Such a need can be met by the subject matter of any of the advantageous embodiments defined in the following description, as well as the accompanying drawings.

A first aspect of the invention relates to an elevator drive for an elevator system. The elevator drive has an electric motor which has a housing which is designed as a permanent magnet synchronous motor and which has a motor shaft which has a drive zone on an axial portion of its lateral surface outside the housing, for coupling to at least one support means of the elevator system.

In a preferred embodiment of the elevator drive, a ratio of a weight of the elevator drive to a nominal payload for which the elevator drive is designed is less than 0.2.

The ratio can be, for example, less than 0.15, for example less than 0.12, for example 0.11. Examples of possible ratios in accordance with the present invention can be, for example:

(28 kg-32 kg)/(630 kg/2)=0.09-0.1; at a weight of the elevator drive of 28 kg to 32 kg (including inverter) and a nominal payload of 630 kg;

(25-27 kg)/(480 kg/2)=0.1-0.11; at a weight of the elevator drive of 25 kg to 27 kg (including inverter) and a nominal payload of 480 kg.

An elevator drive according to the invention thus has, for example, a dead load of typically below 50 kg, preferably between 10 kg and 40 kg, for example 25 kg to 32 kg. In this case, the weight of the electric motor can make up at least 60%, preferably at least 80%, and in particular at least 90%, of the total dead load of the elevator drive. The weight of the elevator drive as described above and in the following can include the weight of an inverter for controlling the electric motor. In a preferred embodiment, the inverter is designed as part of the elevator drive, i.e., for example attached to the electric motor. In this case, a nominal payload for which the elevator drive is designed specifies a maximum weight force which can or may be displaced by means of this elevator drive, due to its design and/or approval. In elevator systems having only one elevator drive, the nominal payload for which the elevator drive is designed can correspond to the nominal payload of the elevator system. In an elevator system having multiple elevator drives, the nominal payload for which the elevator drive is designed can correspond to the nominal payload of the elevator system divided by the number of elevator drives. For example, in an elevator system having two identical elevator drives, the nominal payload for which the elevator drive is designed can correspond to half the nominal payload of the elevator system. In this case, the nominal payload correlates inter alia with the weight of the counterweight or the counterweights, as well as the weight of the elevator car. In this case, properties of the elevator drive that are to be observed for a specified nominal payload are determined by various standards and regulations, for example the European Standard EN81. The nominal payload of an elevator system comprising an elevator drive described herein can typically lie in the range of 50 kg to 5 t, preferably 100 kg to 2 t, in particular between 300 kg and 1 t.

The nominal payload for which the elevator is designed can also be understood as a nominal payload for which the motor is designed. Such a nominal payload includes not only the payload of the elevator, but rather also includes the dead load of the elevator system acting on the drive. In this case, the nominal payload is thus the nominal load of the elevator drive.

Small, powerful electric motors have already been developed in other fields of technology, for example for use in motor vehicles. However, for use as an elevator drive in an elevator system they have hitherto not been used for various reasons and prejudices. The use of multiple small drives was excluded for example due to the resulting complexity resulting in the control of these elevator drives.

The elevator drive described herein can be handled easily, in particular by one person alone. In particular, the elevator drive can be so small and lightweight that it can be handled and in particular raised by a single technician, while maintaining applicable regulations, during installation or maintenance.

Furthermore, such an elevator drive can be compact in design, as a result of which it has a small space requirement. This makes it possible to fasten the elevator drive, for example, in the elevator shaft, on a ceiling of the elevator shaft or a self-supporting construction received in the elevator shaft and provided for example for guiding the elevator car and/or the counterweights. A separate machine room above the elevator shaft for arranging the elevator drive is not necessary. Two of the elevator drives are preferably arranged for the vertical displacement of the elevator car and the counterweights, as explained in more detail below.

A second aspect of the invention relates to an elevator system, having: an elevator shaft; an elevator car which is arranged in the elevator shaft; at least two counterweights which are arranged in the elevator shaft and are each coupled to the elevator car via a support means; at least two of the elevator drives according to the first aspect of the invention, wherein the support means each extend via one of the drive zones of the elevator drives in such a way that the support means can be moved by means of the elevator drives such that the elevator car and the counterweights can be displaced vertically by operating the elevator drives; and a brake, in particular a car brake, by means of which the elevator car and/or the counterweights can be braked and/or locked, Since the elevator system described above and below comprises two elevator drives, it is particularly advantageous to provide a car brake.

The use of two elevator drives for displacing an elevator car makes it possible to distribute loads to be moved over two elevator drives, so that each of the elevator drives has to move only half the load. This makes it possible to design each individual elevator drive to be particularly small and/or lightweight. Such an elevator drive can be handled particularly easily, in particular by one person alone. Furthermore, such an elevator drive can be designed to be particularly compact, as a result of which it has an extremely small space requirement. This makes it possible to fasten the elevator drive, for example in the elevator shaft, to a ceiling of the elevator shaft. A separate space above the elevator shaft for arranging the elevator drive is not necessary.

The elevator system can be a freight or passenger elevator for example. The two counterweights are preferably the same weight. The support means can each have one, two or more cables and/or belts.

Features of the elevator drive according to an embodiment of the first aspect of the invention can also be features of the elevator system according to an embodiment of the second aspect of the invention, and vice versa.

According to one embodiment, an outside diameter of the drive zone corresponds to an outside diameter of the motor shaft. Alternatively, a ratio of the outside diameter of the drive zone to the outside diameter of the motor shaft can be less than 1.4, preferably less than 1.35, in particular less than 1.25. In other words, the outside diameter of the drive zone can substantially correspond to the outside diameter of the motor shaft. In particular, in the case of the elevator drive described herein, a conventional traction sheave having a large outside diameter can preferably be dispensed with. This contributes to the elevator drive being able to be designed in a particularly simple, compact, and lightweight manner. In contrast to conventional elevator drives, the elevator drive according to the invention is constructed such that the traction sheave is not removable. This allows the elevator drive to be constructed more compactly, and to further save weight. The costs which arise in the case of a traction sheave defect are comparatively low, since the elevator drive is also designed otherwise to be compact, and in particular multiple, preferably two, elevator drive units are used per elevator system.

According to one embodiment, the elevator drive further comprises: a circuit board which is arranged on the electric motor, perpendicularly to the motor shaft, on a side of the electric motor facing away from the drive zone, and an inverter for electrically controlling the electric motor, which inverter is arranged on the circuit board and is electrically connected to the electric motor. This contributes to the elevator drive being able to be designed in a particularly simple, compact, and lightweight manner. Furthermore, arranging the circuit board together with the inverter on the side of the electric motor remote from the drive zone constitutes a thermal separation of the electric motor from the inverter. This contributes to particularly good heat management. The circuit board can be, for example, a Printed Circuit Board (PCB). In general, a circuit board in the sense of this description is understood to mean any carrier of one or more electronic components and/or electrical lines. A control of the electric motor can be implemented, for example, on or by means of the printed circuit board. The inverter can serve for a power supply of the electric motor. An elevator system can thus contain a converter for supplying electrical power to the elevator drive. The converter can consist of a mains-side rectifier (passive or active), a DC bus having an energy store, for example a battery and/or a capacitor, and an inverter (also referred to as a power inverter) on the electric motor side. The inverter is electrically connected to the DC bus and generates, from the DC bus voltage, a voltage that has variable amplitude and/or frequency and is intended for controlling the electric motor.

According to one embodiment, the circuit board is mechanically connected to the electric motor on a first side of the circuit board, and a heat sink of the elevator drive is arranged on a second side of the circuit board facing away from the electric motor, which heat sink is in thermal contact with the inverter and has the first cooling ribs which have a zigzag shape. The thermal contact is provided, for example, by a direct physical contact between the inverter and the heat sink. Overall, the cooling of the elevator drive can be designed in such a way that, at least at temperature-sensitive components such as an STO module (STO: safety torque off) or the semiconductor switches of the inverter, no excessive temperatures of, for example, more than 80° C., or in some cases more than 90°, occur during the heat-releasing operation of the elevator drive.

The electric motor and/or the inverter can, for example, be cooled exclusively passively. Such exclusively passive cooling can in particular be made possible in that the entire elevator system has two elevator drives, and thus each individual elevator drive needs to be less powerful and thus generates lower thermal losses. The heat sink having the zigzag-shaped first cooling fins enables a particularly efficient dissipation of heat which arises during operation of the inverter. The heat sink thus contributes to particularly good heat management. Furthermore, the zigzag shape is particularly robust with respect to impacts or other external mechanical influences.

According to one embodiment, the circuit board has a safe torque OFF module, by means of which a power supply of the electric motor can be interrupted, so that the electric motor can no longer generate any torque. The safe torque OFF module can also be referred to as STO module. The STO module can contribute to the fact that, in the event of an emergency or failure, property damage and/or personal injury can be avoided in that the STO module disconnects the inverter, and thus the generation of a torque is stopped. In an elevator system comprising two elevator drives, each individual elevator drive can have a separate safety module. The safety module can be implemented, for example, on or using the circuit board described above, as a result of which installation space and/or costs can be reduced.

According to one embodiment, the circuit board has an encoder which has a magnet and a magnetic field sensor. The magnet can for example be placed on the shaft of the electric motors, the magnetic sensor being arranged on the circuit board in such a way that it can easily detect the magnetic field of the magnet. The encoder thus makes it possible to detect a rotational speed of the electric motor in a particularly simple and compact manner.

According to one embodiment, the circuit board has, on its first side, a first electrical connection for connection to an energy source and a second electrical connection which is electrically connected to the electric motor, the safety module and/or the encoder for receiving and/or transmitting electrical signals. Since the electrical connections are arranged on the first side of the circuit board, which faces the electric motor, the electrical connections are also facing the electric motor. This has the effect that, when corresponding plugs are inserted into the electrical connections, no additional space is required for the plugs outside the region of the elevator drive, as it were "behind" the elevator drive, since the plugs are located in a space between the circuit board and the electric motor. In addition, the connections are easily accessible for a technician during installation or maintenance of the elevator system. The plug is thus arranged on the side of the circuit board facing the motor shaft.

According to one embodiment, the inverter is configured for an operating voltage of less than 60 V. The operating voltage can be less than 48 V, for example. The operating voltage is advantageously over 24 V, preferably over 36 V, particularly preferably over 42 V. This operating voltage relates to the operating voltage of the inverter and not to the operating voltage of the electric motor. The use of low operating voltages can increase safety of the elevator system. In addition, an elevator drive, which, in particular with its inverter, is designed for a low operating voltage, can optionally also be operated using power sources such as battery packs that are commercially available at low cost, it being possible in particular for such power sources to serve as an emergency power source in the event of a failure of the usual power supply system. Such power sources can also be used in conjunction with one or more further power sources. For example, the battery pack power source can serve as a supporting power source in addition to a further power source designed as a mains connection. The battery pack power source can thus contribute to power peaks, as a result of which the power demands on the mains connection are lower.

According to one embodiment, second cooling ribs are arranged on an outer side of the housing, which cooling ribs extend in the direction in parallel with an axis of the motor shaft and which are angled at at least one of their axial ends, an axial portion of the housing that faces the drive zone being free of the second cooling ribs. The second cooling ribs contribute to particularly efficient cooling of the electric motor. The provision of the second cooling ribs can in particular contribute to exclusively passive cooling being sufficient for the elevator drive.

According to one embodiment, the housing has a mechanical interface for connection to a suspension of the elevator system, on a first side of the housing, which mechanical interface is designed such that the elevator drive can be placed on the mechanical interface. Alternatively or additionally, the housing has a deposition surface on a second side of the housing facing away from the first side of the housing, which surface is designed such that the elevator drive can be placed on the deposition surface. In this case, mechanical components or regions of the elevator drive which form the mechanical interface or the deposition surface can preferably be designed and/or dimensioned in such a way that they can carry the weight of the elevator drive without damage. The deposition surface can be formed, for example, by end faces of the second cooling ribs facing away from the motor shaft. The use of the mechanical interface as a deposition surface, and/or the deposition surface itself, contributes to the elevator drive being able to be switched off easily. This contributes to a fitter, who is to fasten the elevator drive in the elevator shaft, being able to transport, handle and assemble the elevator drive in a simplified manner.

According to one embodiment, the drive zone has an uneven profile. In other words, the drive zone can be formed by a profiled surface. The profile can be for example V-shaped and/or can have one, two or more V-shaped notches. The unevenness of the profile, in particular the V-shaped form, increases a surface of the drive zone and thus a contact surface between the motor shaft and the drive zone. This contributes to the adhesion and frictional forces between the support means and the drive zone being particularly large. This enables a particularly safe and precise vertical displacement of the elevator car by means of the elevator drive. In particular, the high adhesion and frictional forces can lead to good traction between the drive zone and the support means, moreover even though the outside diameter of the drive zone can be relatively small in the case of the elevator drive described herein.

According to one embodiment of the elevator system, the latter comprises a control unit. The elevator drives can be designed such that they form a drive unit, the elevator drives being designed in particular in a master-slave configuration for this purpose. The control unit controls the drive unit as though it were a single drive. In a preferred embodiment, the elevator drives are designed such that they rotate in opposite directions.

Above and in the following, the drive unit is to be understood as a functional unit in which multiple (for example two) elevator drives are combined, such that they can be controlled by a control unit as a drive. For example, the inverters of two drives can be designed such that the master function can be assigned to one of the inverters. This inverter (master) takes over the communication with the control unit. That is to say that the control unit specifies a target value, for example a target speed, to this inverter. The master inverter in turn specifies a target value, for example a target torque, to the second inverter (slave). In one embodiment, the two inverters can be formed in one housing.

This allows synchronous control of the two elevator drives in a simple manner, and thus makes it possible to achieve the elevator drive in a simple manner by means of two comparatively smaller elevator drives.

In one embodiment, the elevator drives can be arranged supported. In particular, the elevator drives can be supported on the guide rails in the region of the shaft head of the elevator system.

According to one embodiment of the elevator system, the elevator drives are arranged in the elevator shaft in a manner suspended on a ceiling of the elevator shaft.

A region which adjoins the ceiling in the elevator shaft can also be referred to as a shaft head. The elevator drives can thus be arranged suspended/supported in the shaft head. This makes it possible to dispense with a separate space, in particular a machine room, for arranging the elevator drives above the elevator shaft. This contributes to being able to form the entire elevator system in a particularly compact manner.

According to one embodiment of the elevator system, at least one cable for connection to the first or second electrical connection of the circuit board is guided from one side of the housing, which faces the drive zone, via the housing, to the corresponding first or second electrical connection. This makes it possible to arrange the elevator drives in a particularly space-saving manner, since no additional space is required outside the region of the elevator drives for arranging the cables. Rather, the cables are guided through a region between the electric motor, the circuit board, and the ceiling of the elevator shaft.

Optionally, the elevator system can have a control device for controlling the elevator drives. The control device can have a processor which is configured to control the elevator drives in such a way that they move the corresponding support means, and thus the counterweights and the elevator car, synchronously. The control device may comprise hardware and/or software modules. In addition to the processor, the control device may comprise a memory and data communication interfaces for data communication with peripheral devices.

Embodiments of the invention will be described below with reference to the accompanying drawings, wherein neither the drawings nor the description are intended to be interpreted as limiting the invention.

The drawings are merely schematic, and not to scale. In the different figures, identical reference signs denote identical or similar features.

DETAILED DESCRIPTION

Figure 1:
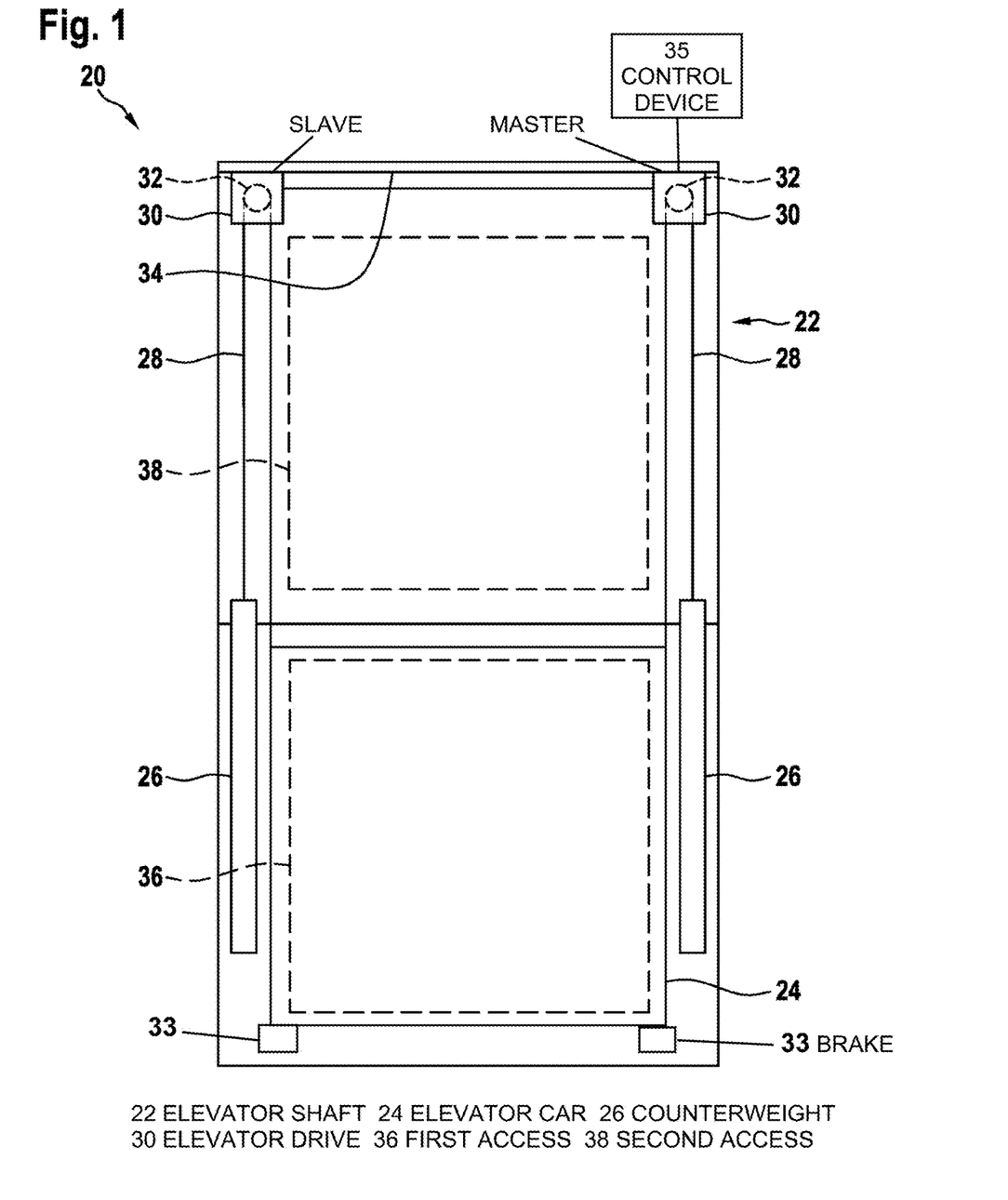
FIG. 1 shows an elevator system according to one embodiment of the invention.

FIG. 1 shows an embodiment of an elevator system 20, such as a passenger or freight elevator. The elevator system 20 has an elevator shaft 22, an elevator car 24, two counterweights 26, two elevator drives 30, which each have a motor shaft 32, support means 28 and a brake 33. The elevator drives 30 are fastened in the region of the ceiling 34 of the elevator shaft 22, in particular supported on a guide rail of the elevator (not shown) or suspended on the ceiling 34 of the elevator shaft 22. A region which adjoins the ceiling 34 in the elevator shaft 22 can also be referred to as a shaft head. The elevator drives 30 are thus arranged in a supported/suspended manner in the shaft head. The support means 28 can, for example, have one or more cables or belts.

The elevator car 24 is arranged in the elevator shaft 22 so as to be vertically displaceable. The counterweights 26 are each connected to the elevator car 24 via the corresponding support means 28. The motor shaft 32 rotates during operation of the electric motor 30. The support means 28 runs over a drive zone 50 (see FIG. 2) on the motor shaft 32 and can be moved by means of the drive zone 50 in such a way that the elevator car 24 and the counterweight 26 can be displaced vertically in cooperation with the support means 28 by operating the electric motor 30. In particular, the elevator car 24 can be displaced vertically from a first floor having a first access 36 to a second floor having a second access 38, or vice versa. Optionally, the elevator shaft 22 can extend over more than two floors having corresponding accesses. The counterweights 26 are preferably of the same weight. The brake 33 allows braking and/or locking of the elevator car 24. Alternatively or additionally, a further brake can be arranged for braking and/or locking the counterweight 26.

A control device 35 for controlling the elevator drive 30 and/or the brake 33 can be communicatively coupled to the elevator drive 30 or the brake 33. The two elevator drives 30 can be designed in a master-slave configuration. For example, the two elevator drives 30 can be synchronized in a torque-controlled manner. In particular, the two elevator drives 30 are controlled and/or synchronized with one another in such a way that they vertically displace the elevator car 24 in a vertically oriented manner, and the counterweights 26 in a uniform manner relative to one another.

Figure 2:
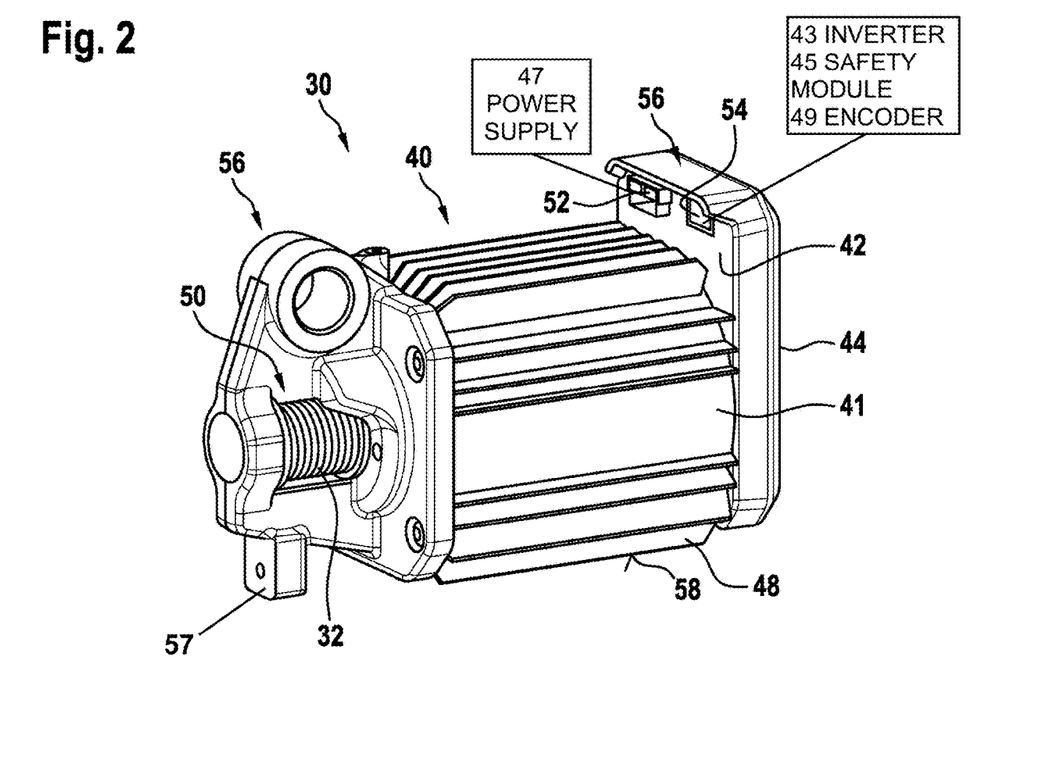
FIG. 2 shows an elevator drive according to one embodiment of the invention.

FIG. 2 shows an elevator drive 30 according to one embodiment of the invention. The elevator drive 30 corresponds to the elevator drive 30 explained with reference to FIG. 1. Therefore, only those features of the elevator drive 30 are discussed below which have not yet been mentioned with reference to FIG. 1. The elevator drive 30 has an electric motor 40 which has a housing 41. The electric motor 40 is designed as a permanent magnet synchronous motor and has a motor shaft 32. On an axial portion of its lateral surface outside the housing 41, the motor shaft 32 comprises the drive zone 50 for coupling to at least one of the support means 28. An outside diameter of the drive zone 50 substantially corresponds to an outside diameter of the motor shaft 32. Alternatively, the motor shaft 32 and the drive zone 50 can be designed such that a ratio of the outside diameter of the drive zone 50 to the outside diameter of the motor shaft 32 is less than 1.4, preferably less than 1.35, in particular less than 1.25. Illustratively, the outside diameter of the drive zone 50 can substantially correspond to the outside diameter of the motor shaft 32. A ratio of a weight of the elevator drive 30 to half a nominal payload of the elevator system 20 is less than 0.2, for example less than 0.15, for example less than 0.12, for example 0.11.

A circuit board 42 (surrounded by a housing) is arranged on a side of the electric motor 40 facing away from the drive zone 50. In particular, the circuit board 42 is arranged on the electric motor 40 perpendicularly to the motor shaft 32. The circuit board 42 faces the electric motor 40 with a first side of the circuit board 42 and is mechanically connected to the electric motor via a housing surrounding the circuit board. An inverter 43 is present on the circuit board 42, which inverter is electrically connected to the electric motor 40 and controls the latter via a DC bus at a voltage which is variable in amplitude and frequency, in order to achieve a predetermined torque. For example, the inverter 43 can be configured for an operating voltage (input side) of less than 60 V, for example less than 48 V.

The inverter can have a safety module 45. A power supply 47 of the electric motor 40 can be interrupted by means of the safety module, so that the electric motor 40 can no longer generate any torque. The safety module 45 (also referred to as STO module) can be implemented, for example, in the form of semiconductor switches or relays which can short-circuit the control inputs of the semiconductor switches of the inverter. The circuit board 42, which has the inverter and the STO module, can further comprise an encoder 49. For this purpose, a magnetic field sensor is positioned on the circuit board 42 such that it can detect the rotating magnetic field of a magnet that is attached to the motor shaft and rotates therewith. The encoder 49 thus makes it possible to measure the actual movement of the motor shafts.

The circuit board 42 can have, on its first side, a first electrical connection 52 and a second electrical connection 54. The first electrical connection 52 is configured to connect the inverter to a power source 47. The second electrical connection 54 is electrically connected to the electric motor 40, the safety module 45, and/or the encoder 49, for receiving and/or transmitting electrical signals. Since the two electrical connections 52, 54 are arranged on the first side of the circuit board 42, they face in the direction towards the electric motor 40. This makes it possible to guide one, two or more cables, for connection to the first or second electrical connection 52, 54, from one side of the housing 41, which faces the drive zone 50, via the housing 41, to the corresponding first or second electrical connection 52, 54. The cables can thus be guided in a space-saving manner through the region between the electric motor 40, the circuit board 42, and the ceiling 34 of the elevator shaft 22, and can thus be kept short.

A heat sink 44 is arranged on a second side of the circuit board 42 remote from the electric motor 40 and is in thermal contact, for example in direct physical contact, with the inverter and/or STO module, i.e., the circuit board 42. The heat sink 44 can have first cooling ribs 46 (see FIG. 4). The circuit board 42 (in particular the inverter and/or the STO module) can be passively cooled by means of the heat sink 44. The thermal load of the electric motor 40 is likewise reduced by the proximity of the heat sink 44 to the electric motor 40. In particular, the heat which arises on the circuit board is discharged on the second side (remote from the machine), and it is thus ensured that this heat does not additionally heat the electric motor. This can make it possible that the elevator drive can be constructed compactly and nevertheless can be cooled exclusively passively.

Second cooling ribs 48 can be arranged on an outer side of the housing 41. The second cooling ribs 48 extend in the direction in parallel with an axis 61 (see FIG. 3) of the motor shaft 32. The second cooling ribs 48 can be angled at at least one of their axial ends. An axial portion of the housing 41, which faces the drive zone 50, can be free of the second cooling ribs. Optionally, the electric motor 40 can be cooled exclusively passively by means of the second cooling ribs 48. Optionally, the electric motor 40 can be cooled exclusively passively by means of the heat sink 44 and the second cooling ribs 48.

The housing 41 can have a mechanical interface 56 for connection to a suspension of the elevator system 20, on a first side of the housing 41, in FIG. 2 on the upper side of the housing 41. Alternatively, the housing 41 can have a deposition surface 58 on a second side of the housing 41 facing away from the first side of the housing 41 (in FIG. 2 on an underside of the housing 41), which deposition surface is designed such that the elevator drive 30 can be safely placed on the deposition surface 58. The deposition surface 58 can be formed, for example, by the end faces of the second cooling ribs 48 remote from the motor shaft 32. For example, multiple these end faces can be located in one plane and together form the deposition surface 58. Furthermore, a lower part 57 of the interface 56 can be designed such that it also forms part of the deposition surface 58 when the elevator drive 30 is being deposited.

Figure 3:
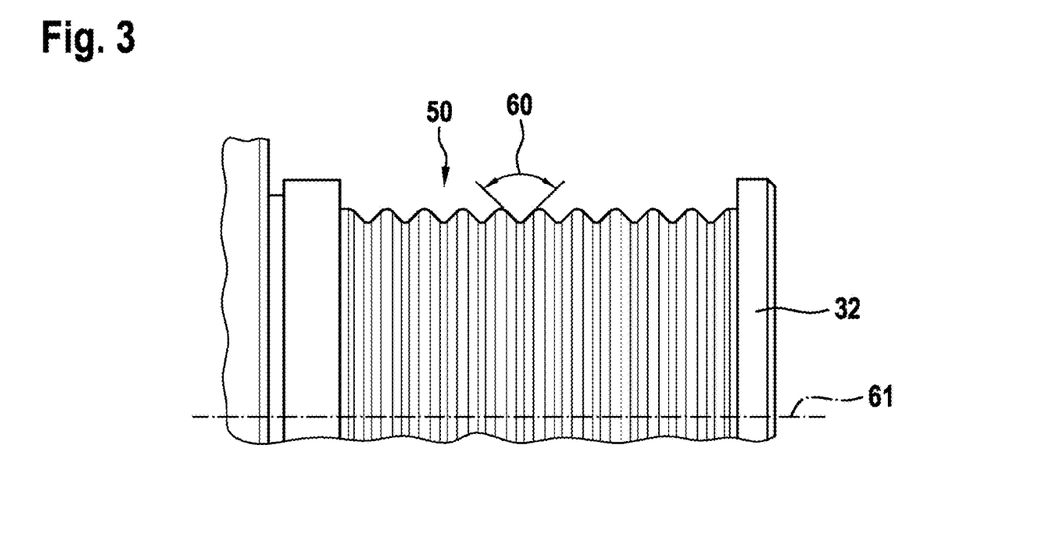
FIG. 3 shows a detailed view of a part of an embodiment of a drive zone of the elevator drive according to FIG. 2.

FIG. 3 is a detailed view of a part of an embodiment of the drive zone 50 of the elevator drive 30 according to FIG. 2. The drive zone 50 can have an uneven profile. The profile can be for example V-shaped and/or can have one, two or more V-shaped notches. The V-shapes of the notches can each have an opening angle 60 of, for example, 90°. The unevenness of the profile, in particular the V-shaped form, increases a surface of the drive zone 50 and thus a contact surface between the motor shaft 32 and the drive zone 50. Due to the V-shaped profile, a traction can be increased when driving a suitably complementarily designed drive means.

Figure 4:
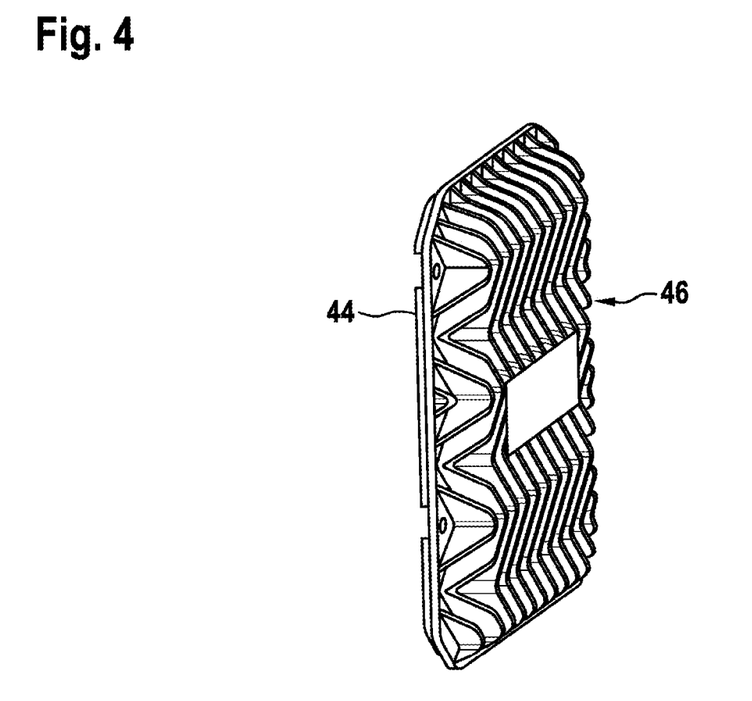
FIG. 4 shows a heat sink according to one embodiment of the invention.

FIG. 4 shows a heat sink 44 according to one embodiment of the invention. The heat sink 44 has first cooling ribs 46. The first cooling ribs 46 can have a zigzag shape. The first cooling ribs can, for example, each have a height of 8 mm or more, for example over 10 mm, for example over 15 mm, and, for example less than 30 mm. The heat sink 44 and/or in particular the first cooling ribs 46 can be produced for example by means of an additive manufacturing method.

Figure 5:
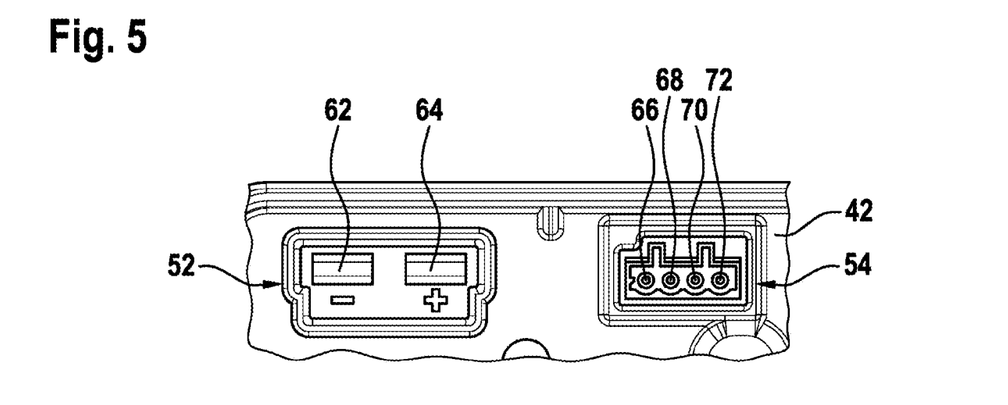
FIG. 5 shows an embodiment of two electrical connections of an inverter of the elevator drive according to FIG. 2.

FIG. 5 shows an embodiment of the two electrical connections 52, 54 of the circuit board 42 of the elevator drive 30 according to FIG. 2. The first electrical connection 52, which is configured to connect the inverter to an external power source (not shown), can have, for example, a negative contact 62 and/or a positive contact 64, it also being possible for the negative contact 62 to be referred to as a ground connection. The second electrical connection 54, which can be configured for example to connect the inverter to the control device, can have, for example, a first CAN (controller area network) contact 66, a second CAN contact 68, an STO negative contact 70, and an STO positive contact 72.

Finally, it should be noted that terms such as "comprising," "having," etc. do not exclude other elements or steps, and terms such as "a" or "an" do not exclude a plurality. Furthermore, it should be noted that features or steps that have been described with reference to one of the above embodiments can also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An elevator drive for an elevator system, the elevator drive comprising:
   an electric motor having a housing, the electric motor being a permanent magnet synchronous motor;
   wherein the electric motor has a motor shaft extending from the housing, the motor shaft having a drive zone on an axial portion of a lateral surface of the motor shaft outside of the housing;

wherein the drive zone is adapted to couple to at least one support means of the elevator system; and a circuit board arranged on the electric motor and extending perpendicularly to an axis of the motor shaft, the circuit board being arranged on a side of the electric motor facing away from the drive zone, and the circuit board having an inverter arranged thereon for electrically controlling the electric motor when the inverter is electrically connected to the electric motor.

2. The elevator drive according to claim 1 wherein a ratio of a weight of the elevator drive to a nominal payload for which the elevator drive is adapted to displace is less than 0.2.

3. The elevator drive according to claim 1 wherein an outside diameter of the drive zone corresponds to an outside diameter of the motor shaft or a ratio of the outside diameter of the drive zone to the outside diameter of the motor shaft is less than 1.4.

4. The elevator drive according to claim 1 wherein the circuit board is mechanically connected to the electric motor on a first side of the circuit board, and including a heat sink arranged on a second side of the circuit board remote from the electric motor, wherein the heat sink is positioned in thermal contact with the inverter, and the heat sink including first cooling ribs.

5. The elevator drive according to claim 4 wherein the first cooling ribs have a zigzag shape.

6. The elevator drive according to claim 4 wherein an outer side of the housing has second cooling ribs arranged thereon, the second cooling ribs extending in the direction in parallel with an axis of the motor shaft and the second cooling ribs being angled at least one of axial ends thereof, and wherein an axial portion of the housing facing the drive zone is free of the second cooling ribs.

7. The elevator drive according to claim 1 wherein the circuit board has safety module arranged thereon for interrupting a power supply of the electric motor so that the electric motor does not generate any torque.

8. The elevator drive according to claim 1 wherein the circuit board has an encoder arranged thereon, the encoder sensing a speed of the electric motor.

9. The elevator drive according to claim 1 wherein the circuit board is mechanically connected to the electric motor on a first side of the circuit board, the circuit board having, on the first side, a first electrical connection adapted for connection to a power supply and a second electrical connection adapted for electrical connection to at least one of the inverter, the electric motor, a safety module and an encoder for receiving and/or transmitting electrical signals through the second electrical connection.

10. The elevator drive according to claim 1 wherein the inverter is configured for an operating voltage of less than 60 V.

11. The elevator drive according to claim 1 wherein the housing has on a first side a mechanical interface adapted for connection to a suspension of the elevator system and for placing the elevator drive on the mechanical interface, and/or the housing has on a second side a deposition surface facing away from the first side, the deposition surface adapted for placing the elevator drive on the deposition surface.

12. The elevator drive according to claim 1 wherein the drive zone has an uneven profile.

13. An elevator system comprising:
an elevator shaft;
an elevator car arranged in the elevator shaft;
two counterweights arranged in the elevator shaft and being coupled to the elevator car by a support means;
two elevator drives according to claim 1, wherein the support means extend over the drive zones of the elevator drives such that the support means is moved by the elevator drives displace the elevator car and the counterweights vertically by operation of the elevator drives; and
a brake adapted to brake the elevator car against movement in the elevator shaft.

14. The elevator system according to claim 13 including a control device controlling the elevator drives in a master-slave configuration as a single drive, and wherein the elevator drives rotate in opposite directions.

15. The elevator system according to claim 13 wherein the elevator drives are arranged in a shaft head of the elevator shaft.

16. The elevator system according to claim 15 wherein each of the circuit boards has a first electrical connection adapted for connection to a power supply and a second electrical connection adapted for electrical connection to at least one of the inverter, the electric motor, a safety module and an encoder for receiving and/or transmitting electrical signals through the second electrical connection, and wherein a region bounded by the electric motor, the circuit board and a ceiling of the elevator shaft guides cables to the first and second electrical connections.

* * * * *